Patented Sept. 7, 1937

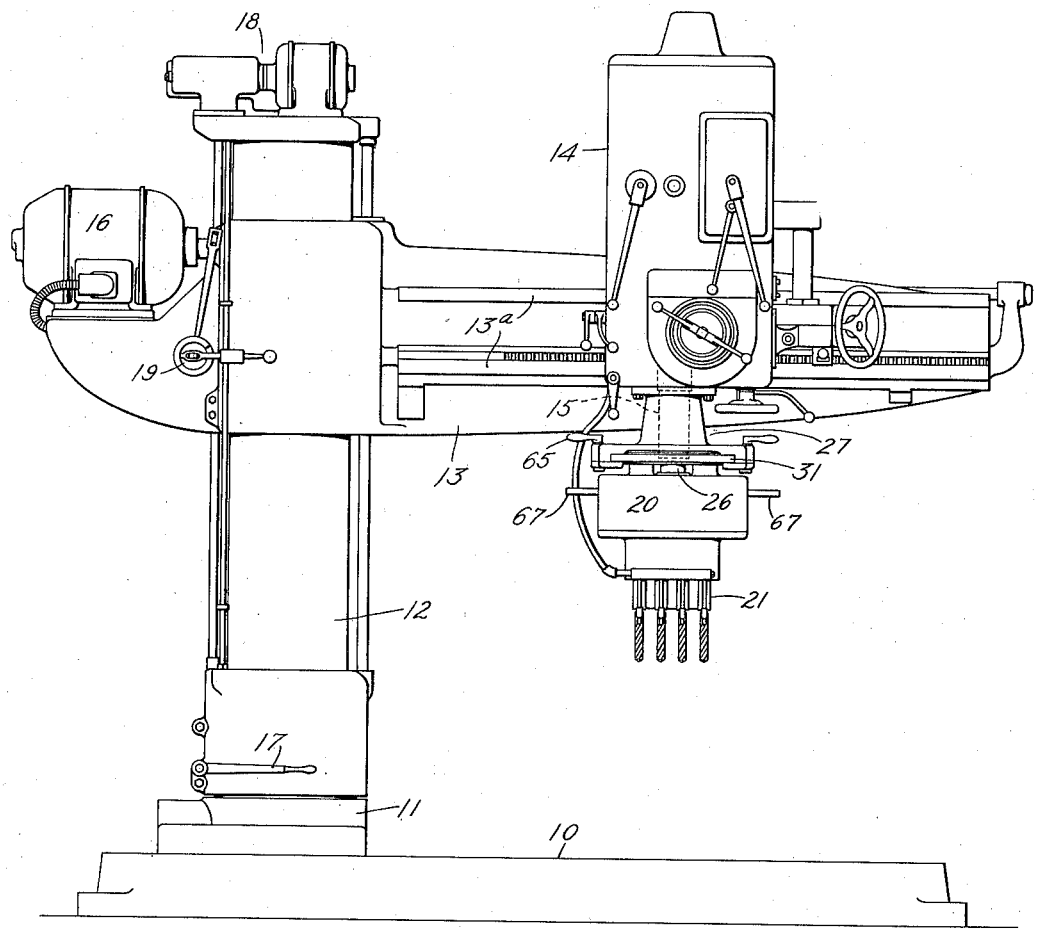

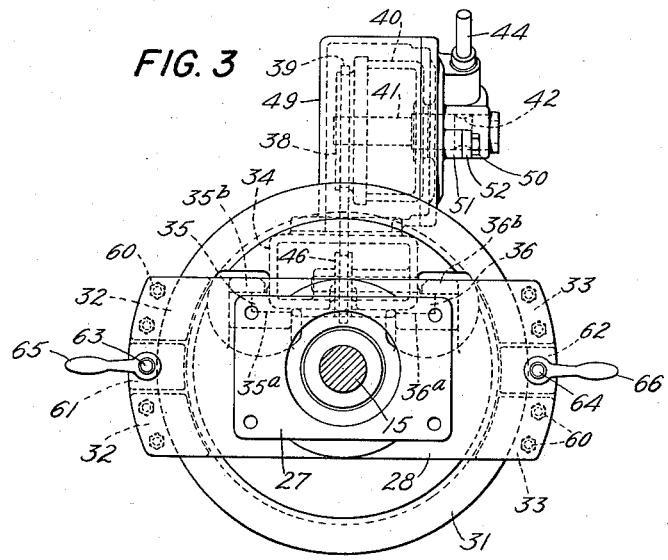
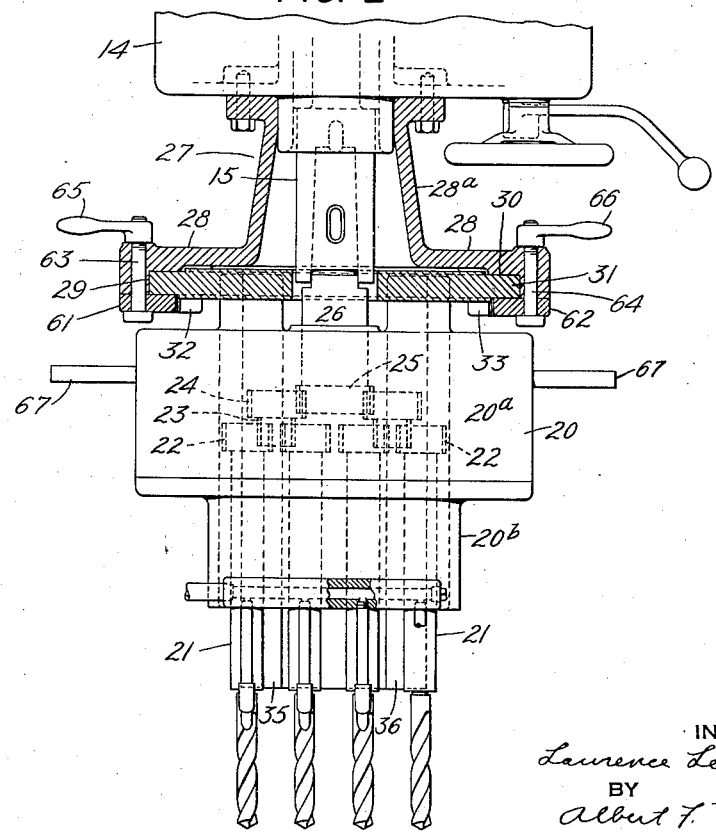

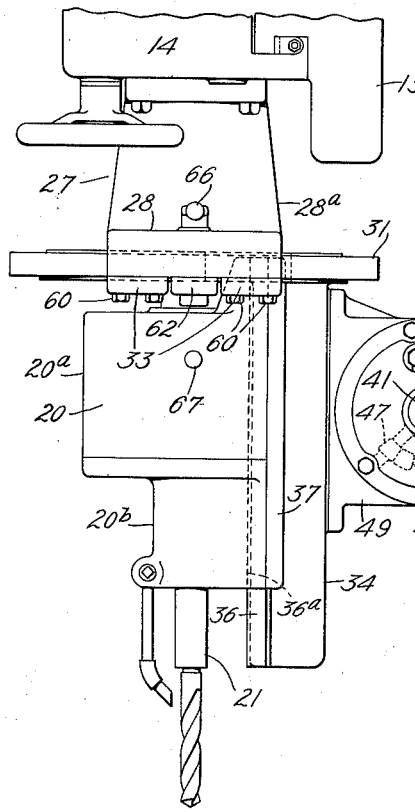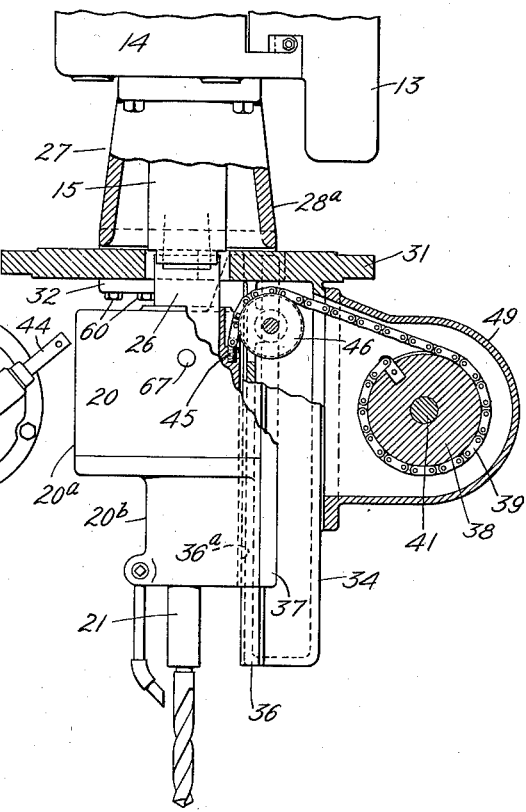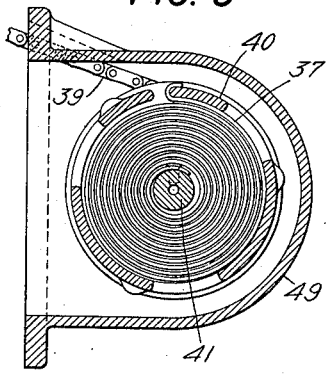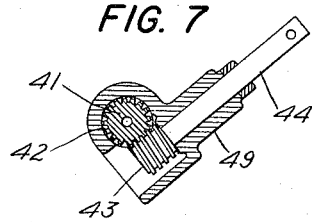

2,092,336

UNITED STATES PATENT OFFICE 2,092,336

REVOLVING MULTIPLE SPINDLE HEAD

Lawrence Lee Schauer, Wyoming, Ohio, assignor to The Cincinnati Bickford Tool Company, Cincinnati, Ohio, a corporation of Ohio Application June 15, 1935, Serial No. 26,757

10 Claims. (Cl. 77—28)

The present invention relates generally to multiple spindle drill heads and particularly to a counterbalanced revolving drill head for use in connection with single spindle radial drilling machines in order that a machine of that character may be readily converted into a machine capable of performing functions quite different from those usually performed thereon.

A primary object of this invention is to eliminate the excessive amount of wear and tear on the conventional single spindle of a machine incident to the attachment thereto of multiple spindle head attachments of the kind heretofore in common use. Usually such attachments are arranged to be clamped to the sleeve of the spindle so as to be translatable therewith. As a consequence, such attachments place an undue load upon the spindle feed and traverse mechanisms and also upon the spindle bearings. As the spindle is advanced, the portion thereof projecting from its bearings becomes greater and greater and the point is quickly reached when the spindle bearings no longer afford accurate guide means for the tools at the outer end of the spindle.

In obviating that objection, it is proposed to support from the underside of the conventional drill head a normally stationary tool slide having integrally formed relatively long and sturdy guideways suitable for the mounting thereon of auxiliary tool heads or fixtures of various sizes and weights. Complemental bearing surfaces are likewise formed upon the auxiliary heads whereby the attached head is accurately guided and firmly supported throughout its range of travel. With an attachment constructed in accordance with this invention, the main tool spindle of the machine is definitely relieved of the burden of supporting and guiding the auxiliary head. The main spindle is in fact, more ably supported in the present construction for the reason that the auxiliary head has its own independent bearing surfaces and which serve likewise to support and pilot the outer end of the main spindle.

Another difficulty encountered in use of the prior multiple spindle heads attachments, and which renders such attachments practically useless for a great many operations, is the inability to adjust the head angularly about its vertical axis more than a very limited amount. For certain special classes of work, a limited indexing movement sufficed. But, such devices, great care was necessary and much time was consumed in obtaining the proper set up. This was due to the reason that such indexing heads were provided with definitely spaced detent or stop means for locating the head precisely in a given angular position. Accordingly, if the main tool head was not located at a definite position outwardly on the radial arm and if the arm was not clamped in the exact radial position required to suit the index stops, the workpiece had to be carefully re-positioned and the machine, as a whole, was thereby robbed of the qualities of a radial drill.

The present invention aims to overcome these and other disadvantages of the prior devices by providing a construction wherein the multiple drill head may be revolved through a complete circle and clamped in any position desired within that range of 360°. With such an arrangement, it is possible to locate the main tool head any distance out from the column of the machine and locate the arm at any required angular position, and yet swing the revolving multiple head through any part of the circle that may be necessary to obtain the proper location of the drills with respect to the work. With a device constructed in accordance with this invention, the angular position of the multiple head is not dependent upon the position of the radial arm or of the head on the arm.

With the guide rod and helix spring balanced heads heretofore used, the length of travel of the head was necessarily greatly restricted; the rods, perforce, being long to accommodate the helicoidal springs, and this interfered with the setting up of workpieces. Furthermore, in such constructions, the head was guided by the rods at or above the extreme upper end, no support was given at the lower end adjacent the tools and in consequence the prior constructions lacked rigidity and the ability to perform drilling operations accurately.

A further aim of this invention is to provide a unitary construction having all the advantages of universal adjustment, sturdiness in all positions of adjustment, together with provision for quickly attaching or removing the unit from the conventional drill head of a radial drill. In achieving those ends, it is proposed to construct a tubular bracket member in a manner adapted to be located over the ends of the conventional spindle and detachably secured to the underside of the drill head casting proper. The tool slide referred to above, is designed to be rotatively mounted on the bracket in such a position that the tool head and parts carried by the slide may be freely rotated to positions under the radial arm as the need requires.

In the present construction, a substantial portion of the weight load of the attachment is carried directly by the main drill head of the machine and not by the drill spindle as is the common practice with many of the attachable heads of the prior designs.

This invention further proposes a means whereby the conventional drill spindle is relieved of all additional weight incident to attaching a multiple spindle unit. That end is accomplished by incorporating a chain and sheave wheel head-counterbalancing mechanism in the rotatable tool slide. Preferably the counterbalance mechanism is located on the slide at the rear thereof whereby to afford the operator a clear and unobstructed view of the drill spindles and the work being performed thereby. With such an arrangement, the weight of the counterbalancing mechanism per se is likewise carried entirely by the main tool head and not by the tool spindle.

To conserve space, a flat spiral spring, incased in a dirt proof housing, is employed to retract the sheave wheel and which, through the medium of a chain, detachably connected to the auxiliary tool head, effects at will an accurate balancing thereof or an overbalancing of the head in the event that it is desired to employ the mechanism to effect a relatively rapid elevation of the rotatable tool head. Auxiliary heads of different spindle combinations and gross weights may thus be conveniently mounted upon the tool slide and balanced by varying the force of the spiral spring. Counterweight mechanisms and the comparatively non-adjustable helix spring devices with their inherent limitations and disadvantages are thus eliminated.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an elevational view of a radial drill embodying this invention.

Figure 2 is an enlarged front view partly in section of a drill head showing a preferred manner of attaching same to the machine shown in Figure 1.

Figure 3 is a plan view of the rotatable unit removed from the machine.

Figures 4 and 5 are side elevation and part sectional views of an attachable unit.

Figures 6 and 7 are detail sectional views illustrating the counter pulling spring and load adjusting mechanism.

Referring more particularly to Figure 1 of the drawings, the radial drill to which the invention is particularly adapted comprises in general a base member 10, an upstanding column 11, a sleeve member 12 rotatable on the column, an arm 13, vertically adjustable on the sleeve, and a tool head 14 movable radially upon the arm along guideways 13ᵃ. The head 14, houses a rotatable and translatable tool spindle 15 which, through suitable speed change gearing, is adapted to be driven at various rates of speed and feed. A motor 16, also mounted upon the arm furnishes the spindle driving power.

In setting up the machine for a tooling operation the proper elevated position of the arm is obtained by raising or lowering same on the sleeve 12, after which it is clamped by the arm clamp 19. The arm 13 is then moved angularly about the post 11 to the position required and then clamped by the manual lever indicated at 17 or the power clamping means 18. The head 14 is then moved along the arm to the proper position, clamped, and the tooling operation started.

The above describes briefly the mechanism and set up for a single spindle machine, and to avoid repeated operations of that character, for example, on a multiple hole workpiece, multiple spindle drill heads having two or more spindles were provided.

As mentioned earlier, however, the drill heads heretofore designed had definite limitations in use, a primary difficulty being that they were not adjustable angularly the minute distances required to compensate for minute adjustments in angular position of the arm and/or the workpiece. In some instances heads have been provided that could be adjusted to definite angular positions only a few degrees out of the plane of the radial arm and in the multiple drilling of a series of holes outside of the limits of movement of the prior heads, or at points intermediate the fixed index points, could not therefore be attempted. Consequently it was necessary to repeatedly relocate the workpiece and repeatedly set up the machine anew several times.

The present invention obviates that difficulty by the provision of means whereby the entire head may be revolved and a row or holes, for example, drilled in transverse directions merely by swinging the revolvable drill head. Figures 2 and 3 illustrate a preferred manner of accomplishing that purpose and in which the numeral 20 represents the multiple spindle tool head having tool spindles 21, of any desired number with their center distances and relative positions arranged to suit the character of the drilling operation.

Each drill spindle 21 is provided at its upper end with a driving gear 22, which through the train of gears 23, 24, 25 and main head drive shaft 26, receives driving power from the main spindle quill 15. The speeds and feeds of the individual spindles 21 are determined by the ratios of the gears 22, 23, and 24, and the usual change speed mechanism (not shown) within the main tool head 14. The upper or driving end of the head drive shaft 26 is provided with a standard taper and a drive key adapted to fit and be driven by the quill 15. Ample clearance is provided between the spindle 15 and the walls of the bracket 27 and the walls of the disc 31 for the purpose of having the head shaft 26 pilot and support the spindle in all positions of its travel toward and away from the work.

The parts are held in driving relation by means of a bracket member 27 which is bolted to the underside of the main tool. The bracket 27 is made relatively long and is provided at its lower end with outwardly extending flanges 28, the outer peripheries of which are arcuately formed. Inside of the outer edges, and on the underside of the flanges, a pair of opposed square guideways 29 and 30 are provided within which is supported and accurately guided, a relatively large diametered disc member 31. The periphery of the disc is formed with bearing surfaces adapted closely to fit the bearing surfaces of the guides 29 and 30 while the strap members 32 and 33, secured to the outer depending portions of the flanges 28 and complete the guideways at the underside of the disc and provide the means for supporting the weight of the head and for clamping the head in any given position.

In the present construction, each of the strap members 32 and 33 is bolted, by means of the bolts 60 to the flanges 28 so that the parts may be easily manufactured and assembled, while at the same time providing means for compensating for wear to restore the unit to its original accuracy.

At each side of the main spindle and intermediate the pairs of straps 32 and 33, clamping means in the form of additional strap elements 61 and 62 are provided. Each of the clamp straps 61 and 62 is adapted to be drawn tightly into engagement with the under side of the rotatable disc 31, by means of draw bolts 63 and 64. The upper ends of the draw bolts are provided with handles 65 and 66 which are so adjusted that a relatively slight turning thereof effects a rigid clamping of the disc 31 to the bracket 27. In this connection it is important to note that the clamps 61 and 62 carry little of the weight of the head, the major portion of the weight being carried by the straps and screws 32, 33, and 60. The latter are adjusted to permit rotary movement of the disc but not so loosely adjusted as to permit or require any vertical movement of the tool slide when the clamp screws are actuated. Short handles 67 fastened to the head 20 are provided for the convenience of the operator in adjusting the angular position of the drill spindles.

It will be observed that the flanged member 27 is provided with a relatively long central section 28ᵃ the upper end which is adapted to encircle a depending spindle bearing portion of the main head thus serving as a means for quickly locating the unit and adding measurably to its rigidity. The portion 28ᵃ is made tubular for strength and sufficiently long to bring the guide ways 30 formed upon the flanges 28, below the underside of the drill arm. Accordingly, the disc member may be made relatively large in diameter and support large heads without danger of any portion of the mechanism striking the arm as it is revolved from one position to another about the axis of the main spindle.

This construction affords a compact arrangement of parts, the center of gravity of which is low and, as the parts may swing freely under the arm, the weight may be distributed substantially uniformly at opposite sides of the arm guides 13ᵃ on which the main tool head 14 is supported.

As illustrated more clearly in Figures 3, 4, and 5, the disc 31 has depending therefrom a bearing bracket 34 which has formed upon its front face a second pair of opposed square guideways 35 and 36 arranged perpendicular to the plane of the arcuate guides mentioned above. At the rear of the tool head 20 a complemental pair of square guideways 35ᵃ and 36ᵃ are formed which interfit with the vertical guides 35 and 36. Strap members 35ᵇ and 36ᵇ secured to the head 20 complete the bearing and provide means for taking up the wear incidental to usage.

It will be observed that the vertical guides for the multiple head are relatively long and narrow, likewise the annular guides are relatively narrow in a vertical direction, spaced far apart longitudinally of the arm, and relatively wide in a direction perpendicular thereto. The net result of such a construction being that the head 20 and the spindles 21 journaled therein are maintained in true alignment irrespective of the angular position of the rotatable tool slide 31—34 or the vertical position of the head on the slide. Furthermore, the portions 31—34 preferably being integrally formed, the spindles are rigidly and accurately supported in their lowermost positions.

For convenience of manufacture the head 20 is made in two sections, a gearing section 20ᵃ and a spindle bearing section 20ᵇ. The guide and bearing surfaces 35ᵃ and 36ᵃ extend the full length of both sections thereby to give the tool head substantial support not only at its upper end but as well as its extreme lower end adjacent the spindles.

The present structure, it will be seen, readily permits of the use of any one of a number of tool heads of different spindle combinations and as the sizes and weights of the different heads will vary greatly, a counterbalancing mechanism is provided that may be used with any selected head. A preferred form of such a mechanism is disclosed in Figures 5, 6, and 7 and comprises essentially a flat spiral spring element 37, a sheave wheel 38, and a flexible cable or chain 39. One end of the spring 37 is interlocked with a housing member 40 to which the sheave wheel 38 is secured, and the other end of the spring is secured to an axle 41, upon which the housing 40 and sheave wheel 38 rotate. The axle 41 is provided adjacent its outer end with worm wheel 42, the teeth of which engage with the teeth of the worm gear 43. The gear 43 is adapted to be rotated by hand through the medium of a crank and shaft 44, whereby the total force of the spring may be varied to give accurate balancing or overbalancing action in the event it is desired to have an automatic rapid return for the head. The worm and worm wheel adjusting mechanism, being self locking, the spring tension remains at the precise value adjusted without further locking devices.

The chain 39 has one end secured to the sheave 38 and its other end detachably secured to the head 20 as at 45. An idler pulley 46 over which the chain passes is journaled centrally in tool slide 31—34 in a position such that the counterpulling force of the spring acts centrally on the head and substantially in the plane of the vertical guides and thus promotes freedom in movement without binding effects.

To prevent the head from bumping at the upper end of its travel, stop lugs 47 and 48 are provided in the counterbalance mechanism. The lug 48 is carried by the spring housing 40, and the lug 47 is secured to the stationary housing 49. The sheave wheel 38 is so proportioned that one revolution thereof is more than sufficient for the full travel of the head 20 and therefore the lugs 47 and 48 are placed so that the movable lug 48 engages the stationary lug and stops the head slightly before the latter strikes the carriage on its upward movement.

A third lug is provided for facilitating the uncoupling of one head and the substitution of another and comprises an adjustable screw 50. The screw 50 is threaded through a pad 51, provided by the cover of the housing 49 and is located an angular distance from the fixed lug 47 an amount approximately equal to the full travel of the head 20. That is, when the head is in its lowered position, the lug 48 lies just ahead of the adjustable lug 50, and when the latter is screwed inwardly, the end thereof forms an abutment in the path of movement of the lug 48 and locks the spring in that position. The chain 39 is then free to be uncoupled from the head 29 and will not fly back to an inaccessible position in the housing. A slotted spacer 52 is, during the normal operation of counterbalance mechanism, placed under the head of the screw 51 to insure that the end thereof is maintained out of the path of movement of the lug 48.

From the foregoing it will be perceived that an extremely sturdy translatable and rotatable tool head is provided and one that may be easily attached or removed as a unitary assembly complete in itself or have applied thereto auxiliary tool head attachments, each of which may be accurately balanced by a single mechanism. The entire arrangement being designed as to give ample supporting and bearing surfaces whereby extreme accuracy in the drilling operation is achieved irrespective of the angular position of the drill head relative to the radial arm or the vertical position of the auxiliary head upon the tool slide.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A self-contained counterbalanced rotatable multiple spindle drill head attachment for the spindle of a conventional radial drill, combining a flanged bracket member adapted to be secured to the drill head of the machine in coaxial alignment with the spindle thereof; annular guideways formed upon said bracket member; a tool slide rotatably mounted in said annular guideways; guideways formed on the slide in a plane perpendicular to the arcuate guideways; a multiple spindle tool head slidable on said last mentioned guideways, the complemental bearing surfaces on said tool head member being coextensive with the length of the head for guiding and supporting the head its full length; manual means for adjusting said tool slide to any given angular position relative to said flanged bracket; adjustable counterbalance means carried by the said tool slide for balancing said tool head thereby to relieve the conventional drill spindle of the weight thereof; comprising a spiral spring mounted on the rear of said tool slide, a sheave wheel operated thereby, and a chain connecting said sheave with said slidable tool head, and manually operable screw shaft for adjusting the tension of said spring to suit the weight of the slidable tool head.

2. A counterbalanced rotatable drill head attachment for radial drills combining a normally stationary tubular bracket member adapted to be secured to the underside of the radial drill tool head in coaxial alignment with the spindle thereof, the lower portion of said tubular member having spaced arcuate guideways formed thereon below the plane of the radial drill arm; a tool slide member provided with an annular peripheral bearing surfaces adapted to coact with said arcuate guides, said member being an inverted L-shape in cross-section having an integral depending portion of a length substantially equal to the available axial travel of the radial drill spindle; a pair of spaced rectangular guideways formed upon the front face thereof of said depending portion; an auxiliary tool head vertically translatable on said pair of guideways; a tool spindle in said head and means for rotating said tool spindle and for translating said tool head from the main spindle of the radial drilling machine; head counterbalancing means carried by said slide at the rear thereof comprising a spring actuated sheave wheel and a flexible cable between said sheave and said tool head; a worm and worm wheel spring tension adjusting mechanism whereby said head may selectively be accurately balanced or overbalanced, a selectively available stop mechanism for limiting the retractive movement of said spring whereby the auxiliary head may be readily detached from said cable; and manual means for revolving said tool slide and parts carried thereby beneath the radial drill arm to any preselected angular position relative thereto.

3. A radial drill combining a horizontally disposed arm; a main tool head translatably mounted upon the front face thereof with the bottom of said tool head above the plane of the underside of said arm; a rotatable and translatable tool spindle journaled in said head; an auxiliary tool head detachably connected to said main head, comprising a tubular bracket member mounted on said main head concentric with the spindle journaled therein, said bracket member having a pair of outwardly disposed flanges provided at its lower end, said flanges lying in a plane below the plane of the underside of said arm; circular guideways formed adjacent the periphery of said flanges; a tool head slide member rotatably mounted on said circular guideways with its axis of rotation in coaxial alignment with the main spindle, said tool slide being L-shaped in cross-section having formed thereon a pair of rectangular guideways arranged perpendicularly to the said circular guideways and disposed laterally to one side of the axis of rotation, said rectangular guideways being of a length substantially equal to the available axial travel of said spindle; an auxiliary tool head slidably on said second mentioned guideways, said auxiliary head having a rotatable but non-translatable tool spindle journaled therein and means for driving said spindle from the said main spindle when said slidable head is mounted on the guideways formed upon said tool slide; means for rotating said L-shaped tool slide through an angular distance of 360° about the axis of said main spindle thereby to position said auxiliary spindle at any predetermined point within said range of rotary movement; and manually operable clamping means for clamping said tool slide in adjusted position.

4. The combination set forth in the preceding claim characterized in that the tool slide clamping means are located adjacent the periphery of said circular guideways and include manually operable draw bolts arranged to exert a clamping force on the said rotatable tool slide member at points diametrically opposite the axis of the main tool spindle.

5. The combination set forth in claim 3 characterized in that said circular guideways are formed upon the underside of the flanges on said tubular bracket member and include load carrying strap members secured to said flanges and which underlie the peripheral portions of said rotatable tool slide member, said strap members being disposed at opposite sides of a plane that includes the axis of the main spindle, and draw bolt clamping means located intermediate the adjacent ends of selected pairs of said strap members for exerting a clamping pressure on that area of the peripheral portion of the tool slide intermediate the ends of said selected pairs of supporting straps, said load carrying straps being so adjusted that they normally carry the full weight load of the tool slide to the exclusion of any appreciable weight load on the said slide clamping means.

6. A radial drill combining a rotatable and vertically adjustable horizontally disposed arm; a non-rotatable main tool head translatably mounted upon the front face thereof; a rotatable and translatable tool spindle journaled in said main head; an auxiliary multiple spindle tool head mechanism detachably connected as a unitary assembly to said main head, comprising a depending bracket member detachably mounted on the underside of said head, said bracket member having a pair of outwardly disposed flanges provided at its lower end in a plane below the plane of the underside of said arm; circular guideways formed concentric to the axis of said main spindle and located adjacent the periphery of said flanges; a tool head slide member rotatable in said guideways with its axis of rotation in coaxial alignment with the main spindle, said tool slide having formed thereon a second pair of guideways arranged perpendicularly to and within the area included by a projection of the said circular guideways; an auxiliary detachable tool head having complemental guideways formed thereon the full length thereof mounted for vertical translation on said tool slide, said head also having a rotatable tool spindle journaled therein and means for driving same from the said main spindle in any angularly adjusted position of said tool slide; said rectangular guideways being of a length affording movement of said tool head a distance equal to the available axial travel of said main spindle; means for rotating said tool slide through an angular distance of 360° about the axis of said main spindle; and manually operable clamping means for clamping said tool slide in adjusted position, comprising a pair of normally load free draw bolts arranged to exert a clamping force on the said rotatable tool slide member at points diametrically opposite the axis of the main tool spindle.

7. In combination with a radial drilling machine having a rotatable and vertical translatable arm member, a non-rotatable tool head member translatable on the arm, and a rotatable and translatable main tool spindle journaled in said head, of a multiple spindle tool head attachment therefor comprising a stationary bracket member secured to said main head in spaced relation with said spindle; a tool slide member rotatably supported from said bracket member, said slide member being rotatable through 360° relative to said bracket; a pair of vertically arranged rectangular guideways formed on said slide of a length affording the full axial travel of said radial drill spindle; an auxiliary tool head having complemental guideways its full length and rotatable spindles and drive gearing, including a pilot drive shaft, journaled therein, slidably fitted to the rectangular guideways formed upon said slide; said tool slide also having an aperture therein adapted to receive the end of said main tool spindle thereby to establish a driving connection between said main spindle and said pilot drive shaft, said pilot shaft thereby serving to guide and support said main spindle in all of its axially adjusted positions; means for rotating said auxiliary head and slide member through any given fraction of said 360° of available movement; and means carried by said tool slide for relieving the said main spindle of the total weight load of the attachment.

8. A unitary rotatable drill head attachment for a conventional radial drilling machine embodying a normally stationary bracket member adapted to be secured to the underside of the conventional non-rotatable radial drill tool head, the lower portion of said member having spaced arcuate guideways formed thereon below the plane of the conventional radial drill arm; a tool slide member provided with an annular peripheral bearing surfaces rotatably mounted in said arcuate guides, said member being also provided with a depending portion having a pair of spaced rectangular guideways formed upon the front face thereof and within the area defined by a projection of said arcuate guides; an auxiliary tool head vertically translatable on said last mentioned pair of guideways and supported and guided solely thereby in all positions of the main spindle; power means for translating said tool head in one direction and means for translating the head in the opposite direction comprising head counterbalancing means carried by said slide at the rear thereof including a sheave wheel and a flexible cable between said sheave and said tool head, and means for applying a counter force to said sheave wheel of a value normally tending to retract the tool head; and manual means for revolving said tool slide and parts carried thereby as a unit to any preselected angular position relative to the radial drill arm.

9. A radial drill combining a rotatable and vertically adjustable horizontally disposed arm member; a main tool head translatably mounted on guideways formed on said arm; a rotatable and translatable tool spindle journaled in said head; an L-shaped tool slide adapted to be secured to and movable with said head member, said slide including an integrally formed depending portion having one face thereof in a plane offset from and parallel to the line of translation of said spindle and substantially coplanar with said arm guideways; rectangular guideways formed upon the face of said depending portion facing said spindle; an auxiliary tool head having complemental guideways formed thereon its full length reciprocably mounted on the guideways on said depending portion; said guideways on the depending portion extending to the end thereof and serving to guide and support said auxiliary tool head against lateral movement in all positions of said head on said slide; piloting means in said tool head for supporting the lower end of said spindle in all positions of axial movement thereof; means for detachably mounting said tool slide to said main drill head; and means carried by said tool slide for counterbalancing the added weight of the auxiliary tool head.

10. A tool head attachment for the spindle of a conventional drilling machine comprising a bracket member adapted to be removably fastened to the conventional drill head in axial alignment with the tool spindle thereof; a tool slide member revolvably mounted in said bracket, said slide having a depending portion laterally offset from the axis of the tool spindle; rectangular guideways on the side of said depending portion facing the axis of the spindle; an auxiliary tool head provided with complemental guideways its full length mounted on said tool slide member, said tool head having at least one auxiliary spindle journaled therein; driving means for said auxiliary spindle including an adapter element journaled in said head coaxial with said first mentioned tool spindle for driving the auxiliary spindle and providing means for supporting the outer end of the first mentioned tool spindle in all positions of axial movement thereof; means for adjusting said tool slide and auxiliary tool head angularly about the axis of said tool spindle; means for clamping said slide to said bracket in angularly adjusted position; and counterbalance means within the length of travel of said auxiliary head on the said depending portion of said tool slide for counteracting the added weight of said auxiliary head.

LAWRENCE LEE SCHAUER.